Dec. 8, 1942.    E. R. BARRETT    2,304,622
DEMOUNTABLE BODY
Filed Feb. 15, 1941    3 Sheets-Sheet 1

INVENTOR
Edward R. Barrett
BY
Harness, Dickey & Pierce
ATTORNEYS.

INVENTOR
Edward R. Barrett
BY
Harness, Dickey & Pierce.
ATTORNEYS.

Dec. 8, 1942.     E. R. BARRETT     2,304,622
DEMOUNTABLE BODY
Filed Feb. 15, 1941     3 Sheets-Sheet 3

INVENTOR
Edward R. Barrett.
BY
Harness, Dickey & Pierce
ATTORNEYS.

Patented Dec. 8, 1942

2,304,622

UNITED STATES PATENT OFFICE 2,304,622

DEMOUNTABLE BODY

Edward R. Barrett, Detroit, Mich., assignor to Gar Wood Industries, Inc., Detroit, Mich., a corporation of Michigan Application February 15, 1941, Serial No. 379,005

3 Claims. (Cl. 214—65)

The present invention relates to a demountable body, and particularly relates to such type body which is adapted to be removably mounted on a truck chassis to be transported thereby.

One of the primary objects of the present invention is to provide an improved demountable body of such a construction that the capacity thereof is considerably increased over prior bodies of the same type and of comparable overall dimensions.

Another object of the invention is to provide a body of the type mentioned having means thereon whereby the body may be supported independently of the truck and whereby the body may be quickly and easily demounted from the truck or remounted thereon.

A further object of the invention is to provide hydraulically operated means for supporting the body independently of the truck and for facilitating removal of the truck from under the body.

Other objects of the invention will become apparent from the following specification, the drawings relating thereto, and from the claims hereinafter set forth.

In the drawings, in which like numerals are used to designate like parts in the several views throughout:

Figure 1:
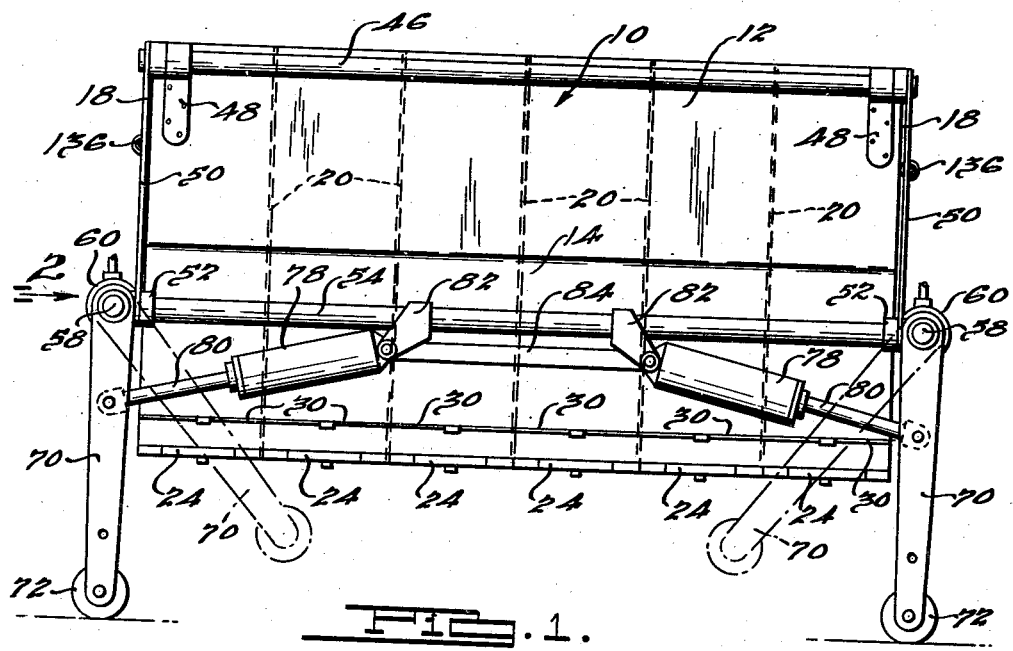
Fig. 1 is a side elevational view of a demountable truck body, showing such body on its independent mounting means.

In general, according to the present invention, a demountable truck body is provided in which such body is formed of a plurality of compartments with downwardly directed central discharge openings formed therein. Such body is so constructed as to make full use of the overall dimensions in providing for payload, in that the ends of the body are substantially vertical and only the bottoms of the side walls slope toward the center. Means are provided for releasably mounting the body on the truck chassis, and further power operated means are provided which include ground engaging arms. Such arms are first moved outwardly, so as to clear the truck wheels, and then are moved downwardly into ground engaging position to raise the body slightly above the chassis and to provide independent supports for the body. The truck may thereafter be driven from under the body; and when it is desired to haul the body away, the truck merely needs to be backed up to its initial position and the power means operated to lower the body and retract the ground engaging wheels so that the body may then be connected again to the truck chassis. The hydraulic circuit is such that the ground engaging arms are first moved outwardly to clear the wheels before they are lowered toward the ground, so that no interference with the wheels will be present.

For a better understanding of the invention, reference may be had to the drawings, and particularly to Figs. 1 through 4 thereof, in which one embodiment of the invention is illustrated.

A demountable body is generally indicated at 10 which includes side walls 12 having upstanding upper portions and having downwardly and inwardly sloping bottom portions 14. Such bottom portions 14 terminate in depending lower edge portions 16, which are substantially vertical and are in spaced relation to each other to provide discharge openings. The body 10 also includes substantially vertical end wall members 18, which are fixed to the side members, as by welding.

A plurality of longitudinally spaced, transversely extending, vertical partitioning members 20 are disposed within the body and extend between the side walls 12 and are fixed thereto to provide a plurality of separate compartments within the body. Such members 20 are of the same shape as the end members 18, having the shape shown in end elevation in Fig. 2.

The side walls, the end walls and the partitioning members define the walls of the separate chambers and provide a separate discharge opening 22 for each of such chambers. A gate member 24 is positioned over the lower end of such opening having one edge 26 thereof pivoted to one of the depending sides 14 and having the other edge releasably held closed by means of a latch 28. A measuring slide member 30 may be slidably received through a slot 32 provided in one of the side member portions 14 adjacent the top of the opening 22 for measuring the material received within such opening.

Figure 2:
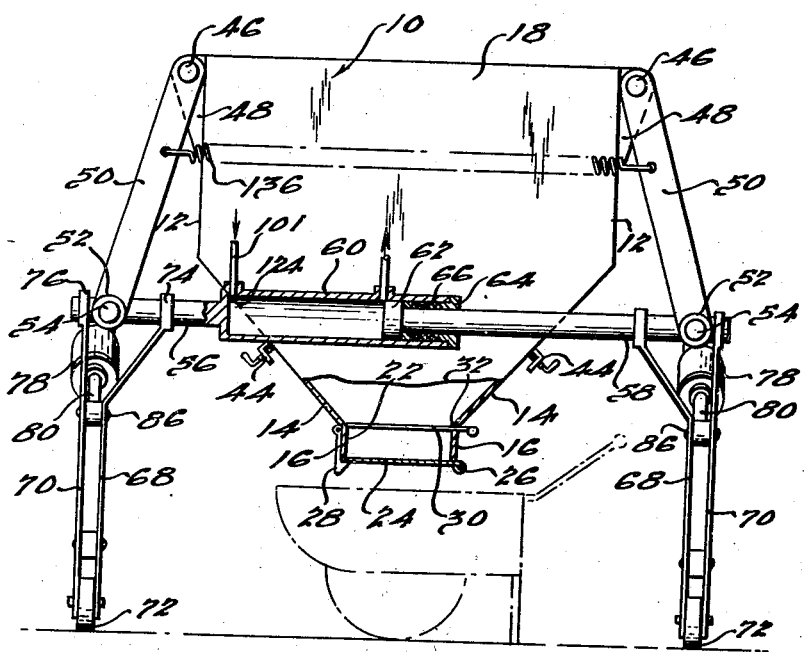
Fig. 2 is an end elevational view of the construction shown in Fig. 1, taken substantially in the direction of the arrow 2 of Fig. 1 and showing one of the hydraulically operated jacks in cross-section.

Thus, by removing the slide, the material within one of the compartments will drop down into the discharge opening 22 and be held in position by the closed gate 24. By then positioning the slide 30 as shown in Fig. 2, a measured quantity of the material will be discharged from the opening 22 when the gate 24 is released. It will be evident that if it is desired, the slide 30 may be left out, so that each bin may be continuously discharged until it is empty.

Figure 3:
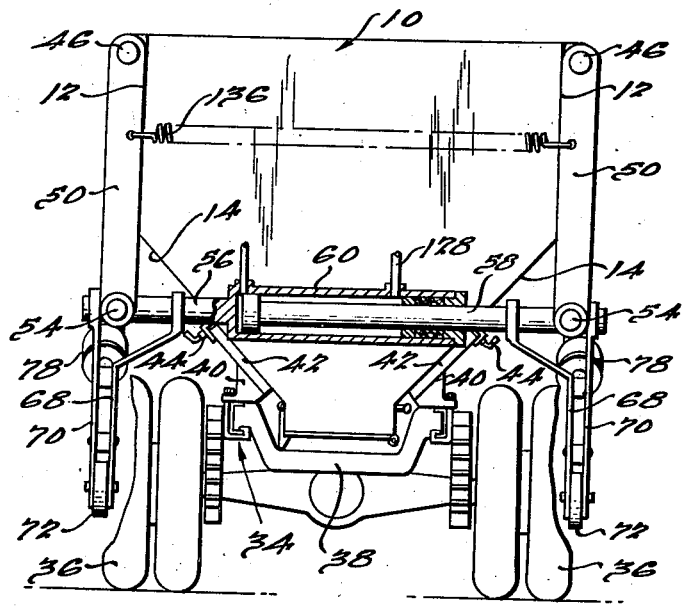
Fig. 3 is a view similar to Fig. 2, but showing a body mounted on the truck chassis and supported thereby.

The body 10 is adapted to be removably mounted on the chassis, generally indicated at 34, of an automotive truck having conventional ground engaging wheels 36. Such truck chassis has transversely extending members 38 with dropped central portions, as shown in Fig. 3, for the reception of the walls forming the opening 24 which are received within such drop frame members 38. Mounting brackets 40 are fixed to the longitudinals of the chassis 34, and have upwardly and outwardly inclined supporting members 42 secured thereon which run along the length of the chassis. Such members 42 are sloped complementarily to the slope of the bottom portions 14 of the body, so that such body may rest on and be supported by the members 42.

Clamps 44 are mounted on the bottom portions 14 of the side walls 12 of the body 10, and are adapted to releasably engage the upper outer ends of members 42 for releasably connecting the body 10 to the truck.

Means are also provided for supporting the body 10 independently of the truck and for positioning it so that the truck may be readily and easily moved from under the body. Such means include longitudinally extending shaft members 46, disposed at each side of the body along the upper edge thereof and mounted to the body by means of brackets 48.

Depending struts 50 are provided at each corner of the body and have their upper ends pivotally connected to the shafts 46. The lower ends of such members 50 are formed with hub portions 52, which pivotally receive therethrough a longitudinally extending shaft 54 at each side of the body. The shafts 54 project through the hubs 50, and the projecting ends of one of the members 54 pass through a pivot aperture provided in a transversely extending cylindrical strut 56; and the other member 54 passes through a pivot opening in another transversely extending cylindrical strut 58. The strut 56 has an hydraulic cylinder 60 rigidly connected thereto; and the strut 58 provides the piston rod of an integral piston 62 which is slidably received within the cylinder 60. Such cylinder 60 has the usual cap 64 through which the piston rod or strut 58 is slidably received and is provided with the usual packing 66 therein. Such packing 66 further locates the stroke of the piston 58 in one direction. It is to be understood that there is one of such cylinders and pistons provided at each end of the body.

Depending ground engaging arm members are provided at each corner of the body and are formed by upstanding members 68 and 70, having a ground engaging wheel 72 pivotally connected thereto adjacent the lower ends thereof. The upper ends of members 68 and 70 have hub portions 74 and 76, respectively, which straddle the shafts 54 and pivotally receive therethrough the cylindrical strut 56 at one side of the body, and the piston rod 58 at the other side of the body. It will thus be seen that the ground engaging arms are pivoted with respect to the members 56 and 58.

An hydraulic jack is provided for moving each of the ground engaging arms 68, and such jack includes the usual hydraulic cylinder 78 having a piston rod 80 projecting from one end thereof. The base end of each of the cylinders 78 is pivotally mounted to a mounting bracket 82 which, in turn, is mounted on shaft 54. The brackets 82 are fixed with respect to such shaft so that the base ends of the cylinders are fixed and the base ends of the jacks on one side of the body may be connected by a compression strut 84. The outer ends of the piston rods 80 extend between the members 68 and 70 of the ground engaging arms, and are pivotally connected thereto by means of a pivot pin 86.

It will thus be seen that when the cylinders 60 and piston rods 58 are extended with respect to each other, the ground engaging arms are first moved outwardly away from the body as the arms 50, together with the shafts 54, swing out from the position shown in Fig. 3 to the position shown in Fig. 2. The pistons 80 are then extended so that the ground engaging arms are swung downwardly from the position shown in broken lines to the position shown in full lines in Fig. 1.

Figure 4:
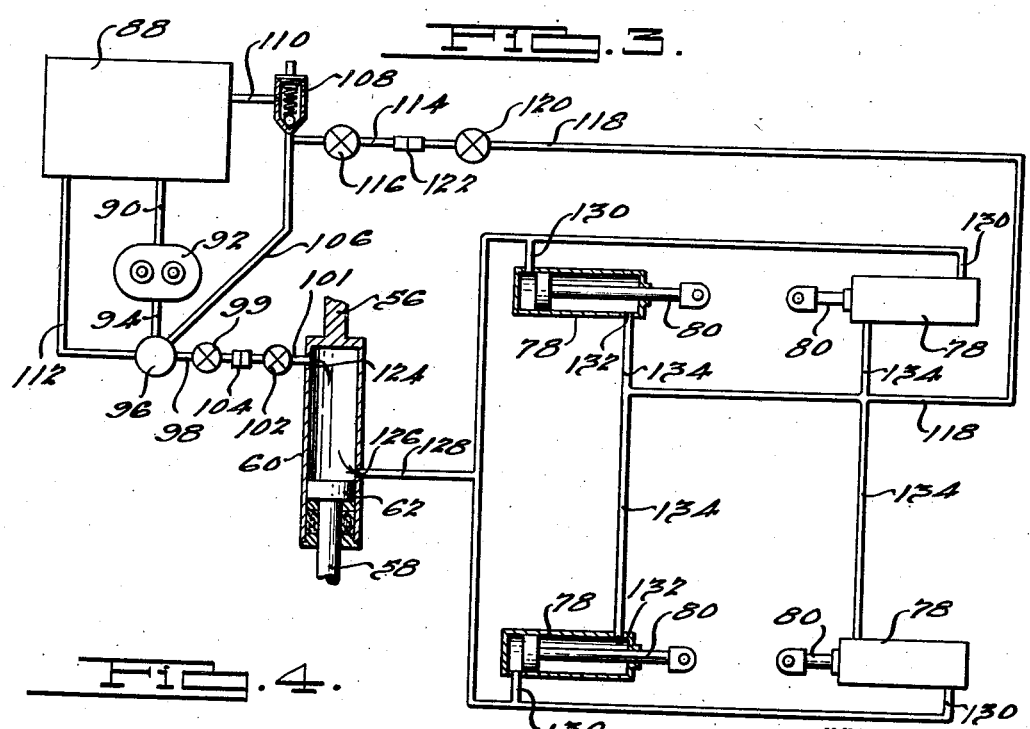
Fig. 4 is a diagrammatic view of the hydraulic circuit and associated operating elements used with the structure disclosed in Figs. 1 to 3.

The power means for operating the cylinders and for moving the arms are shown in Fig. 4, and comprise a tank or reservoir 88 adapted to contain the operating fluid, preferably oil. Such tank 88 has a supply conduit 90 communicating with the interior thereof which is adapted to communicate with the inlet of a conventional hydraulic pump 92. The outlet of the pump 92 communicates with an outlet conduit 94 connected to the inlet of a conventional four-way valve 96. One of the outlets of the four-way valve 96 communicates with a supply conduit 98, having a conventional shut-off valve 99 interposed therein, which communicates with an inlet or supply conduit 101, the conduit also having a shut-off valve 102 interposed therein. The conduits 98 and 101 may be removably connected together by means of a suitable coupling 104.

A by-pass conduit 106 communicates with one of the other ports of the four-way valve 96, and returns to the tank through a conventional pressure relief valve 108 and through a conduit 110. Another return conduit 112 communicates with one of the other ports of the four-way valve 96 and returns directly to the tank. Another return conduit 114, having a conventional shut-off valve 116 interposed therein, is connected to a return conduit 118, also having a conventional shut-off valve 120 interposed therein, by means of a suitable coupling 122.

The tank 88, pump 92, valve 96 and conduits 90, 94, 98, 106, 110, 112, and 114 are mounted on the truck in a manner similar to the mounting of similar elements in the dump body hydraulic hoist art. The pump 92 is driven by means of a suitable power take-off from the engine transmission, as is usual in the hydraulic hoist art. The conduits 101 and 118 are mounted on the body 10; and the conduit 101 communicates with an inlet port 124 of the cylinder 60. Such port 124 is located adjacent the base end of the cylinder, and an outlet port 126 is provided in the cylinder wall located at a predetermined distance between the base and cap ends of the cylinder. A conduit 128 communicates with the port 126 and includes branch conduits 130, which communicate with the cylinders 78 adjacent the base ends thereof for admitting fluid to such cylinders for extending the piston rods 80. Outlet ports 132 are disposed in the opposite ends of the cylinders 78 and communicate with return conduits 134, all of which communicate with return line 118.

With the body mounted on the truck, as shown in Fig. 3, and with the conduits 98 and 101 and conduits 114 and 118 connected and the shut-off valves open, the valve 96 is positioned to admit fluid under pressure into conduit 101. Such conduit 101 admits the fluid under pressure into the cylinder 60 to first extend the members 56 and 58 in order to swing the ground engaging arms outwardly to the lateral position shown in Fig. 2. The port 126 is so positioned that it is not uncovered until the piston 62 has passed thereby, to the position shown in Fig. 4, and so that the members 56 and 58 are extended a predetermined distance before the fluid under pressure passes into conduit 128. When the port 126 is uncovered, such fluid under pressure passes into conduit 128 and into conduits 130 to extend the piston rods 80. This drives the ground engaging arms downwardly from the position shown in broken lines to that shown in full lines, in Fig. 1, so that the wheels 72 engage the ground. The ground engaging arms are of such a length with respect to the height of the chassis, that the body is raised above the chassis a slight amount. It will, of course, be understood that the clamps 44 have first been released.

With the body 10 slightly raised above the chassis and with the wheels 72 engaging the ground, the body 10 is supported on the ground independently of the truck. The shut-off valves 99, 102, 116 and 120 may then be shut off and the couplings 104 and 122 disconnected, so that the truck may be driven out from under the body. The body 10 may be left to stand in such position and the wheelbarrow, such as that shown in broken lines in Fig. 2, or similar transporting means, may be positioned under the body for receiving the materials as they are discharged therefrom.

When it is desired to remount the body 10 on the chassis, it is merely necessary to back the chassis into its initial position under the body and connect couplings 104 and 122 again, and open the shut-off valves and four-way valve 96 so that the fluid under pressure passes through conduits 106, 118 and 134 to cylinders 78 to move the pistons 80 in the opposite direction. This will swing the ground engaging arms back up into their initial position, and such arms may be pushed inwardly to collapse the struts 56 and 58. A transversely extending spiral spring 136 may be connected to the members 58 for assisting in pulling such members back into their initial position against the sides of the body. The clamps 44 may be repositioned to clamp against members 42 and thus secure the body 10 onto the chassis.

Figure 5:
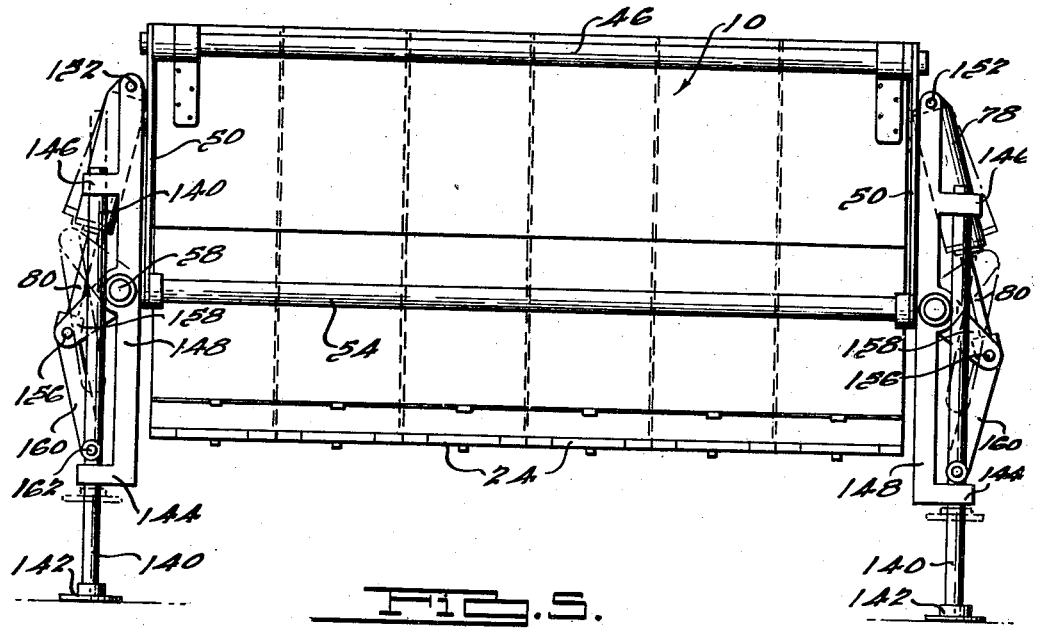
Fig. 5 is a view similar to Fig. 1, illustrating a modified form of the body.
Figure 6:
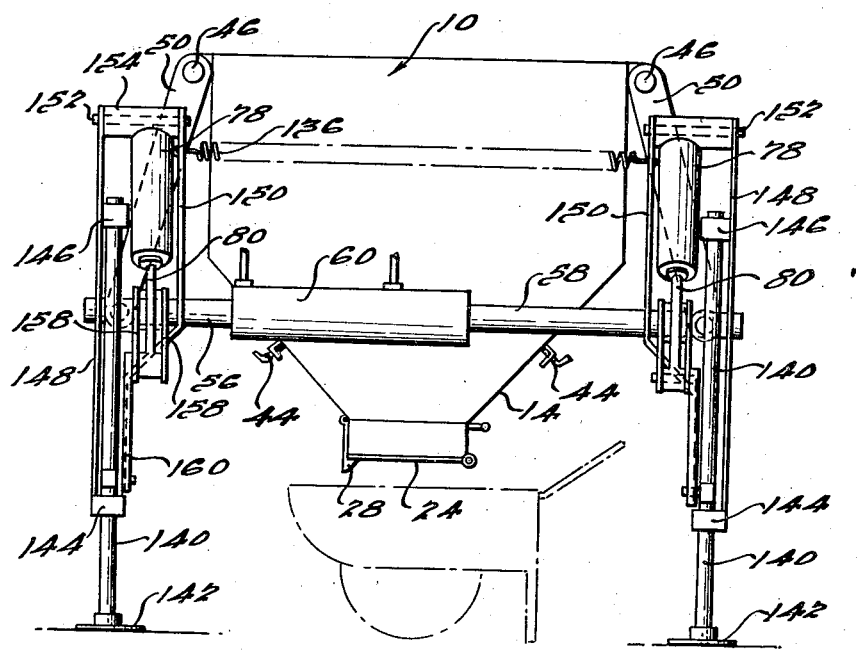
Fig. 6 is an end elevational view of the structure shown in Fig. 5.

In Figs. 5 and 6, a modified form of the present invention is illustrated in which the ground engaging members move vertically, rather than swing downwardly, as in the embodiment described above.

The means for supporting the ground engaging wheels and the hydraulic circuit, including the hydraulic jacks, are substantially the same as that in the embodiment described above, and similar reference numerals have been used in Figs. 5 and 6.

The ground engaging arms include depending members 140 having ground engaging enlargements 142 secured to the bottom ends thereof. Such members 140 are slidably received within bearing collars 144 and 146 mounted on an upstanding frame member 148. The members 148 at the corners of the body are fixedly mounted to the members 56 or 58. Another depending frame member 150 is spaced inwardly from each of the members 148 and is also fixed to the members 56 or 58. A pivot shaft 152 and a spacer sleeve 56 are disposed between members 148 and 150 adjacent the top thereof, and provide a pivot mounting for the base end of one of the hydraulic cylinders 78. The piston rod 80 of each of the cylinders 78 projects downwardly and is pivotally connected by means of a pivot pin 156 with crank arms 158 and 160. The crank arms 158 have their inner ends pivotally connected to the members 56 or 58 so that the pivot pin 156 is limited to move in an arc with the arms 158 as the radius. The lower end of each of the members 160 is pivotally connected to the ground engaging member 140 by means of a pivot pin 162.

It will thus be seen that with the admission of fluid under pressure to the cylinder 60, the members 56 and 58 are first extended to move the ground engaging members 140 together with the supporting framework and hydraulic cylinder 78 and piston rod 80 outwardly, away from the body, to clear the ground wheels of the truck. Thereafter, the hydraulic jacks 78 are operated to move the crank arms 158 and 160 from the position shown in broken lines in Fig. 5 to that shown in full lines, so that the members 140 are moved downwardly into engagement with the ground. The travel of such arms 140 is such that the body 10 is raised slightly above the chassis so that the truck may be removed therefrom, as in the embodiment described above.

Formal changes may be made in the specific embodiment of the invention described without departing from the spirit and substance of the invention, the scope of which is commensurate with the appended claims.

What is claimed is:

1. In combination, a truck including a chassis, a body adapted to be mounted thereon, means demountably connecting said body to said chassis, and hydraulically actuated means mounted on said body for supporting said body when disconnected from said chassis, said last named means including movable ground engaging members, hydraulic jacks operatively connected with said members to move said members outwardly of said chassis, and hydraulic jacks operatively connected to said body and to said members for moving said members toward the ground.

2. In combination, a truck including a chassis, a body adapted to be mounted thereon, means demountably connecting said body to said chassis, and hydraulically actuated means mounted on said body for supporting said body when disconnected from said chassis, said last named means including movable ground engaging members, hydraulic jacks operatively connected with said members to move said members outwardly of said chassis, hydraulic jacks operatively connected to said body and to said members for moving said members toward the ground, and means providing an hydraulic circuit between said first named jacks and said second named jacks so constructed that said members are first moved outwardly and then downwardly.

3. In combination, a truck including a chassis, a body adapted to be mounted thereon, means demountably connecting said body to said chassis, hydraulically actuated means mounted on said body for supporting said body when disconnected from said chassis, said last named means including ground engaging members mounted for movement outwardly of the chassis and toward the ground, an hydraulically responsive element for moving said members outwardly, another hydraulically responsive element for moving said members downwardly, and means hydraulically connecting said hydraulically responsive elements in a series so that said members are first moved outwardly and then downwardly.

EDWARD R. BARRETT.